United States Patent Office 3,170,899
Patented Feb. 23, 1965

3,170,899
COPOLYMERS OF OLEFINIC COMPOUNDS WITH p-TERTIARY ALKYL PHENYL ACRYLATES AND ISOMERS THEREOF
Stanley Tocker, Wilmington, Del., assignor to E. I. du Pont de Nemours and Company, Wilmington, Del., a corporation of Delaware
No Drawing. Filed Feb. 29, 1960, Ser. No. 11,441
25 Claims. (Cl. 260—86.7)

This invention relates to organic polymeric structures and particularly to shaped articles such as polymeric films suitable for outdoor use.

Many organic polymeric structures, such as structures of polyethylene, polypropylene and the like, i.e., polymers of aliphatic alpha-olefins, deteriorate rapidly when subjected to sunlight. The materials are sensitive to light in the ultraviolet range, particularly in the wave length range of 2900–3800 A. Exposure to ultraviolet light tends to embrittle the structures and reduce the level of their electrical and physical properties substantially. Some polymers acquire an undesirable color on exposure to ultraviolet light.

The use of certain chemical compounds as ultraviolet absorbers in mechanical mixture with the polymers is known. Thus, compounds such as benzophenones or salicylic esters have been incorporated in the molten polymer prior to forming a structure or they have been coated on the surface of the polymeric structures. In either case, the protection afforded by these compounds is not permanent. The compounds gradually disappear from the polymeric structure due to their volatility.

Also, while the known light stabilizers do provide some benefits in the stabilization of the polymeric structures, in general they do not stabilize sufficiently well throughout the broad range in which polymeric structures such as described above are sensitive to degradation by ultraviolet light.

The object of the present invention is to provide a substantially permanent weather-resistant organic polymeric shaped article, particularly film, suitable for prolonged outdoor use. It is a further object to provide a substantially permanent weather-resistant organic polymeric shaped article which is resistant to the degradation of ultraviolet light over a wide range of wave lengths. Other objects will appear hereinafter.

The objects are accomplished by a copolymer of 90–99.99 mole percent of at least one unsaturated aliphatic compound, compound A, having the structural formula:

wherein $R_1$ is selected from the group consisting of hydrogen and alkyl having 1–4 carbon atoms, and .01–10 mole percent of at least one unsaturated compound, compound B, having the structural formula:

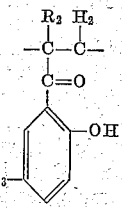

wherein $R_2$ is selected from the group consisting of hydrogen and alkyl having 1–3 carbon atoms and $R_3$ is a tertiary alkyl radical having 4–7 carbon atoms, the precise nature of the copolymer to be described subsequently.

Specifically, the objects are accomplished by a copolymer of 90–99.99 mole percent of the recurring unit

and 0.01–10 mole percent of the recurring unit

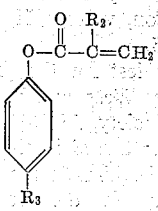

the copolymer having an inherent viscosity of 0.3–3.0, preferably 0.5–1.5.

PREPARATION OF THE STABILIZING PRECURSOR, THE PARA-SUBSTITUTED PHENYL ACRYLATE MONOMER

Esters such as p-tertiary-butylphenyl methacrylate can be most conveniently prepared by reaction of the corresponding alpha, beta-unsaturated acid chloride, methacrylyl chloride, on a phenol, p-tertiary-butylphenol. The reactions proceed rapidly even at room temperature and the yields are generally high. The esterifications can also be accomplished by the use of acylating agents such as acrylic acid anhydride but these esterifications proceed more slowly at lower temperatures. At higher temperatures, acylations with the acid anhydrides proceed more rapidly but care must be taken to avoid premature rearrangement.

The ethylenically unsaturated portion of the ultraviolet light stabilizing precursor can comprise acrylic, methacrylic, ethacrylic and propylacrylic esters. The acrylic and methacrylic esters are preferred because they copolymerize more readily. The methacryl esters are especially preferred in that they do not, by virtue of their structure, introduce tertiary hydrogen atoms in the copolymer chain.

Various tertiary alkyl groups can be employed in the para-position of the phenyl nucleus to block the migration of the rearranging group from entering the para-position. Thus, such groups as tertiary-butyl, tertiary-amyl, tertiary-hexyl and tertiary-heptyl groups may be employed. The phenyl nucleus may also be substituted with other alkyl groups or halogen groups so long as they do not interfere with the rearrangement of the carboxylic ester to the ortho-hydroxy phenone structure.

COPOLYMERIZATION OF STABILIZING PRECURSOR WITH

The process for preparing the copolymers involves subjecting the monomers, preferably in a liquid hydrocarbon or halogenated hydrocarbon solvent such as hexane, benzene, toluene, tetrachloroethylene, to a temperature of −40° to 300° C. and a pressure of 1–3000 atmospheres in the presence of a catalyst for a contact time sufficient to form the copolymer, usually at least 20 seconds for a continuous process and at least 3 minutes for a batch process, and then isolating the resulting copolymer.

When high pressures are used, 800 atmospheres and above, a conventional peroxide (di-tertiary-butyl peroxide) or azo catalyst (alpha, alpha'-azobisdicyclohexanecarbonitrile) may be used and the temperature is preferably 25°–175° C.

It is believed that the essential feature of this type of catalyst, or more properly termed "initiator," is that they are capable of generating free radicals. These free radical initiators, whether they be generated from a peroxide compound or from an azo-type compound combine with a polymerizable monomer to form a new free radical; the new free radical combines with another monomer molecule to form still another free radical; this process is repeated until there is propagated a long polymer chain, as is well known in the art. Polymer chain growth terminates when the free radical-bearing polymer fragment encounters another free radical which, for example, may be another growing polymer chain or an initiator free radical.

Typical peroxides which release free radicals to function as initiators include benzoyl peroxide, di-tertiary-butyl peroxide, di-tertiary-butyl peroxydicarbonate, 2,2-bis-(tertiarybutylperoxy) butane, dimethyl dioxide, diethyl dioxide, dipropyl dioxide, propyl ether dioxide and propyl methyl dioxide. Organic hydroperoxides also applicable are, for example, tertiary-butylhydroperoxide, cumene hydroperoxide, ethyl hydroperoxide, and can be used to initiate polymerizations of this kind. Combinations such as ammonium persulfate with a reducing agent can also be used. Typical azo compounds which decompose to liberate free radicals for initiation of polymerization include such catalysts as alpha, alpha'-azobis-dicyclohexanecarbonitrile, alpha, alpha'-azobisisobutyronitrile, triphenylmethylazobenzene, 1,1'-azodicycloheptanecarbonitrile, alpha, alpha'-azobisisobutyramide, lithium azodisulfonates, magnesium azodisulfonate, dimethyl alpha, alpha'-azodiisobutyrate, alpha, alpha'-azobis(alpha, gamma-dimethylvaleronitrile) and alpha, alpha'-azobis-(alpha, beta-dimethylbutyronitrile).

"Coordination" catalysts, as defined in U.S. Patent 2,822,357, may also be used to effect copolymerization. Specifically, such "coordination" catalysts are composed of:

(A) a compound containing at least one metal of the group consisting of metals of Groups IV$a$, V$a$ and VI$a$ of the periodic table, iron, cobalt, copper, nickel and manganese, said metal having directly attached thereto at least one substituent from the group consisting of halogen, oxygen, hydrocarbon and =O-hydrocarbon; and (B) a reducing compound selected from the group consisting of metal hydrides and compounds having a metal of Groups I, II and III of the periodic table, said metal being above hydrogen in the electromotive series, attached directly through a single bond to a carbon atom, said carbon atom selected from the group consisting of trigonal carbon and tetrahedral carbon.

In the above definitions, period table means Mendeleeff's Periodic Table of the Elements 25th ed., Handbook of Chemistry and Physics, published by the Chemical Rubber Publishing Co. Specific examples of compound (A) included in the above definition are titanium tetrachloride, titanium tetrafluoride, zirconium tetrachloride, niobium pentachloride, vanadium tetrachloride, vanadyl trichloride, tantalum pentabromide, cerium trichloride, molybdenum pentachloride, tungsten hexachloride, cobaltic chloride, ferric bromide, tetra(2-ethylhexyl)-titanate, tetrapropyl titanate, titanium oleate, octylene glycol titanate, triethanolamine titanate, tetraethyl zirconate, tetra(chloroethyl) zirconate and the like. Specific examples of compound (B) in this definition are phenyl magnesium bromide, lithium aluminum tetraalkyl, aluminum trialkyl, dimethyl cadmium, diphenyl tin and the like.

Copolymerization is preferably carried out in a solvent medium. Among the solvents which have been found useful in the present invention are hydrocarbons and halogenated hydrocarbons: hexane, benzene, toluene, cyclohexane, bromobenzene, chlorobenzene, o-dichlorobenzene, tetrachloroethylene, dichloromethane and 1,1,2,2-tetrachloroethane. Heterocyclic compounds such as tetrahydrofuran, thiophene and dioxane may also be used.

In some instances, copolymerization may be effected without a solvent or in an emulsion or slurry system.

The ratio of the light stabilizing precursor to ethylene and/or other monomer reacted therewith should be such that the final copolymer is composed of .01–10 mole percent of the stabilizing precursor and 99.99–90 mole percent of the other monomer or monomers. Less than .01 percent of the stabilizer does not provide adequate protection against ultraviolet light. More than 10 percent tends to affect adversely the physical properties of the basically polyethylene or polypropylene, etc., structure. It has been found that this reaction is very efficient so that a reaction mixture of about .01–10 mole percent of the stabilizing precursor and about 99.99–90 mole percent of the remaining monomer or monomers usually will provide the desired polymer product. It is also possible to graft copolymerize the ethylenically unsaturated stabilizing precursor to the preformed olefin polymer.

REARRANGEMENT OF THE POLYMER

The rearrangement of the polymers is carired out in the presence of a Friedel-Crafts catalyst. After isolating and purifying the polymer, it is dispersed in an appropriate anhydrous liquid such as pyridine, benzene, nitrobenzene xylene, ether or the like. The rearrangements are effected by heating the reactant at moderately high temperatures, for example, 90° C–124° C., in the presence of a Friedel-Crafts catalyst such as ferric bormide, aluminum chloride, antimony pentachloride, stannic chloride and boron trifluoride for 5–60 minutes to rearrange the substituted methacrylyl ester of the phenol to form the substituted phenone.

The polymer product is a substantially linear polymer havig pendant groups of the formula:

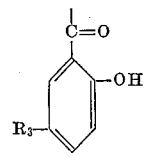

and having an inherent viscosity of 0.3–3.0, preferably 0.5 to 1.5. In the preferred polymer, the linear portion of the polymer is hydrocarbon, i.e., composed solely of carbon and hydrogen.

The invention will be more clearly understood by referring to the examples which follow, Example 1 representing the best mode contemplated for practicing the invention. It is understood that the examples, although illustrating specific embodiments of the present invention, should not be considered limitative of the invention.

The determination of the structure is accomplished by Infrared Spectral Techniques [1] known to those skilled in the art. The infrared spectra herein were taken on pressed films by the use of a Perkin-Elmer Model 21 Spectrophotometer or a Perkin-Elmer Infracord Spectrophotometer following the known techniques.

Measurements of ultraviolet light absorption were carried out in accordance with procedures described in "Analytical Chemistry" by C. R. N. Strouts, J. H. Gilfillan and H. N. Wilson, volume II, chapter 22, Oxford University Press, 1955.

The ferric chloride test for the presence of phenolic groups is described by Wesp and Brode, Journal of the American Chemical Society, 56 1037 (1934).

The light stability test used in the examples was carried out by exposing the films to the action of a bank of Westinghouse Sunlamps for the periods indictaed.

Inherent viscosity is defined by L. H. Cragg in the

---

[1] W. M. D. Bryant and R. C. Voter, Journal of American Chemical Society, 75, 6113 (1953). F. W. Billmeyer, "Textbook of Polymer Chemistry," chapter 7, Interscience Publishers 1957.

Journal of Colloid Science, volume I, pages 261–9 (May 1946) as:

$$\text{Inherent viscosity} = \frac{\ln \text{relative viscosity}}{C}$$

where relative viscosity is the ratio of the solution viscosity to the solvent viscosity, and C is the concentration of solute in solution measured as grams of polymer per 100 ml. of alpha-chloronaphthalene at 125° C.

EXAMPLE 1

*Preparation of p-tertiary-butylphenyl methacrylate*

A solution of 25.0 grams (0.17 mole) of p-tertiary-butylphenol dissolved in 50 ml. of anhydrous pyridine was treated with 22.0 grams (0.21 mole) of methacrylyl chloride. The mixture was vigorously shaken and then heated on a water bath at 60° C.–70° C. for one hour under anhydrous conditions. A 100 ml. portion of ethyl ether was added to the mixture after it had been cooled and the resultant solution was extracted with cold water. The organic phase was stripped of ether and fractionally distilled. The fraction distilling at 120° C.–122° C. at a pressure of 0.4 mm. mercury was found to be the desired product. The yield was 18.4 grams.

An infrared scan showed absorption at 1725 cm.$^{-1}$, characteristic of an ester group. There was no evidence of any maxima between 3000–4000 A. indicating no chelated hydroxyl group absorption. Successful esterification was also supported by a negative ferric chloride test.

The chemical analysis was: carbon, 76.64%; hydrogen, 8.42%. When calculated for $C_{14}H_{18}O_2$: carbon should be 77.03%; hydrogen, 8.31%. The product was, therefore, p-tertiary-butylphenyl methacrylate.

*Copolymerization of p-tertiary-butylphenyl methacrylate with ethylene*

A solution of 112 ml. of benzene, 1.0 grams of tertiary-butylphenyl methacrylate and 0.1 gram of azobiscyclohexanecarbonitrile was poured into a 300 ml. shaker tube. The tube was purged several times with nitrogen and then ethylene was pressured in at approximately 24 atmospheres. The temperature was raised to 120° C. resulting in an autogenous pressure of approximately 800 atmospheres. After a reaction time of one hour at 120° C.–125° C., with frequent repressuring of ethylene to 800 atmospheres, the reaction was stopped. The solid contents were purified by washing with copious quantities of methanol in an Osterizer and dried. The yield was 24.8 grams.

A film was made by pressing a one-square inch sample of this material at 115° C. and 30 tons pressure. Infrared analysis, based on the ester absorption band at 1725 cm.$^{-1}$ showed 2 mole percent of methacrylic groups in the polymer. Repeated dissolving of the product in, and reprecipitation from, toluene produced no composition change as indicated by infrared analysis. This was additional evidence that a true polymer had been produced.

*Rearrangement of the copolymer*

Under anhydrous conditions, 2.0 grams of the copolymer described above was dispersed in 50 ml. of anhydrous nitrobenzene in an Osterizer. The dispersion was transferred quickly to a dry 500 ml. three-necked flask equipped with a stirrer, thermometer and condenser. While stirring under anhydrous conditions, 0.2 gram of powdered aluminum chloride was added quickly to the mixture and the reactants were heated at 120° C. for 20 minutes. The reactor was cooled and the contents were washed in an Osterizer successively with the following solutions: (A) 50 ml. of methanol, 50 ml. of water and 20 ml. of concentrated hydrochloric acid, (B) 50 ml. of water and 50 ml. of methanol and (C) 100 ml. of methanol.

A one-square inch sample of the resulting dried white powder was pressed at 125° C. at 30 tons pressure for one minute to give a clear film which showed infrared absorption at 1650 cm.$^{-1}$ indicative of bonded carbonyl and an ultraviolet absorption peak in the 3300 A. region, also characteristic of a bonded carbonyl group. The material, before being rearranged, had not shown evidence of the bonded carbonyl group on infrared absorption nor the maximum in ultraviolet light absorption in the 3300 A. region. The inherent viscosity taken on a solution of 0.1 gram of the polymer in 100 ml. of alpha-chloronaphthalene at 125° C. was 0.85.

The film of the copolymer was flexible after 1200 hours exposure to a bank of Westinghouse F–S ultraviolet sunlamps; a polyethylene control film cracked upon flexing after 150 hours.

EXAMPLE 2

*Preparation of p-tertiary-butylphenyl acrylate*

Ten grams of acrylyl chloride was added dropwise to a stirred solution of 15 grams of p-tertiary-butylphenol, 150 ml. of water and 4.5 grams of sodium hydroxide. The oil layer which formed was separated from the water layer and dissolved in ether. The ether solution was dried over anhydrous sodium sulfate. The ether was then removed by heating on a water bath. The oil remaining distilled at 88° C. at a pressure of 0.4 mm. mercury. Its chemical analysis was: carbon, 76.20%; hydrogen, 7.46%. When calculated for $C_{13}H_{16}O_2$: carbon should be 76.44%; hydrogen, 7.90%. The product was, therefore, p-tertiary-butylphenyl acrylate.

*Copolymerization of p-tertiary-butylphenyl acrylate with butene-1*

A mixture of 0.2 ml. of vanadyl trichloride and 5 ml. of 1 M aluminum triisobutyl was added to 200 ml. of stirred anhydrous chlorobenzene under nitrogen. To this there was added simultaneously at 25° C. butene-1 at the rate of 175 cc./min. and a solution of p-tertiary-butylphenyl acrylate (1.5 grams diluted in 20 ml. of chlorobenzene) at the rate of 0.5 ml./min. The reaction product was treated successively with the following solutions: (A) cold 5% hydrochloric acid in methanol, (B) 50% methanol and (C) methanol. The solvent was evaporated in a vacuum oven at 70° C. to yield 12 grams of the copolymer.

A film was prepared by pressing a one-square inch sample of the polymer at 125° C. under 20 tons pressure. On infrared analysis, the film showed strong absorption bands at 1725 cm.$^{-1}$, characteristic of an ester group. The product contained about 2.5 mole percent of the acrylic ester. This situation did not change upon dissolving the product in and reprecipitating it from toluene. This was additional evidence that a true polymer had been produced.

*Rearrangement of the copolymer*

The copolymer was dissolved in anhydrous nitrobenzene to which there was added with stirring 0.2 gram of powdered ferric bromide and the reactants were heated at 120° C. for 20 minutes. The product was collected and purified in accordance with the procedure described in Example 1.

A film was prepared by pressing a one-square inch sample of the rearranged copolymer at 125° C. under 20 tons pressure. On infrared analysis, the film showed strong absorption bands at 1650 cm.$^{-1}$, characteristic of a bonded carbonyl group and showed a maximum in ultraviolet light absorption at 3300 A. The inherent viscosity of the rearranged copolymer was 0.78 as obtained on a solution of 0.1 gram of the polymer in 100 ml. of alpha-chloronaphthalene at 125° C.

A film of the rearranged copolymer was flexible after 800 hours exposure to a bank of Westinghouse F–S ultraviolet sunlamps; a polybutene-1 control film cracked upon flexing after 120 hours.

EXAMPLE 3

*Copolymerization of p-tertiary-butylphenyl methacrylate with propylene*

The p-tertiary-butylphenyl methacrylate had been prepared as in Example 1. Copolymerization of propylene with p-tertiary-butylphenyl methacrylate was carried out in the manner described in Example 2. The copolymer product was pressed into a film at 125° C. under 20 tons pressure. The film showed a strong infrared absorption band at 1725 cm.$^{-1}$, characteristic of an ester group. Dissolving the product in toluene and reprecipitating it did not reduce the infrared absorption shown by the ester group, indicating that a true copolymer had been obtained. The product contained about 2.7 mole percent of combined methacrylic ester.

*Rearrangement of the copolymer*

The copolymer was dissolved in anhydrous hexane and was then submitted to the action of aluminum chloride following the procedure described in Example 1. The rearranged copolymer film product showed a strong infrared absorption band at 1650 cm., $^{-1}$, characteristic of a bonded carbonyl group and showed an ultraviolet absorption peak at 3300 A. Its inherent viscosity was 0.90, measured as in Examples 1 and 2.

A film of the copolymer was flexible after 800 hours exposure to a bank of Westinghouse ultraviolet sunlamps; a polypropylene control film cracked upon flexing after 120 hours exposure.

The main advantage of this invention is that because the light-stabilizing precursor does not contain a phenolic hydroxyl, there is nothing to inhibit the copolymerization with the other copolymerizing monomer. Thus, a high proportion of the light-stabilizing precursor can be incorporated into the polymer. The copolymer can then be subjected to the action of a Friedel-Crafts catalyst and the light-stabilizing nucleus can be formed in situ to give enhanced resistance to degradation from ultraviolet light. It is also clear that by incorporating the light-stabilizing ingredient in the base polymeric structure as part of a copolymer, adverse incompatibility effects are avoided and the light-stabilizing function is essentially permanent. A further advantage is that a separate processing step, such as milling or dissolution, is not required to incorporate the light-stabilizing composition into the base polymer. The copolymer and its light-stabilizing qualities are provided during copolymerization and rearrangement. Moreover, incorporation of the light stabilizer in this manner can be done in conventional polymerization equipment.

The products of this invention are resistant to degradation by ultraviolet light over a wide range of frequency and for prolonged periods of time. As copolymeric structures, e.g., self-supporting films, supported films (laminates and coatings), filaments, tubing, etc., they are important for outdoor commercial applications. Thus, these structures will find utility in the preparation of greenhouses, exterior screening, garden hose, as part of automobile exteriors, etc.

As discussed previously, it is also possible to graft copolymerize the polymerizable light-stabilizing monomer precursor on to a prepolymerized ethylenic or other unsaturated compound of the type defined hereinbefore. This product can then be subjected to the reaction of a Friedel-Crafts catalyst to form the effective light-stabilized product. This would be especially useful where it was desired to confine the light-stabilizing composition to the surface as a coating.

Having fully disclosed the invention, what is claimed is:

1. A copolymer of 90–99.99 mole percent of at least one unsaturated aliphatic compound, compound A, having the structural formula:

wherein

R$_1$ is selected from the group consisting of hydrogen and alkyl having 1–4 carbon atoms, and at least .01 mole percent of at least one unsaturated compound, compound B, having the structural formula:

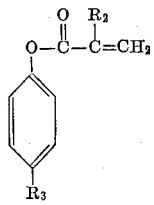

wherein

R$_2$ is selected from the group consisting of hydrogen and alkyl having 1–3 carbon atoms and R$_3$ is a tertiary alkyl radical having 4–7 carbon atoms.

2. A copolymer as in claim 1 wherein compound A is ethylene.

3. A copolymer as in claim 1 wherein compound A is propylene.

4. A copolymer as in claim 1 wherein compound A is butene-1.

5. A copolymer as in claim 1 wherein compound B is p-tertiary-butylphenyl methacrylate.

6. A copolymer as in claim 1 wherein compound B is p-tertiary-butylphenyl acrylate.

7. A film comprising a copolymer of 90–99.99 mole percent of at least one unsaturated aliphatic compound, compound A, having the structural formula:

wherein

R$_1$ is selected from the group consisting of hydrogen and alkyl having 1–4 carbon atoms, and at least .01 mole percent of at least one unsaturated compound, compound B, having the structural formula:

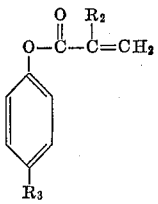

wherein

R$_2$ is selected from the group consisting of hydrogen and alkyl having 1–3 carbon atoms and R$_3$ is a tertiary alkyl radical having 4–7 carbon atoms.

8. A self-supporting film comprising a copolymer of 90–99.99 mole percent of at least one unsaturated aliphatic compound, compound A, having the structural formula:

wherein

R$_1$ is selected from the group consisting of hydrogen and alkyl having 1–4 carbon atoms, and at least .01 mole percent of at least one unsaturated compound, compound B, having the structural formula:

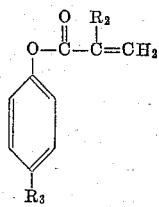

wherein $R_2$ is selected from the group consisting of hydrogen and alkyl having 1–3 carbon atoms and $R_3$ is a tertiary alkyl radical having 4–7 carbon atoms.

9. A filament comprising a copolymer of 90–99.99 mole percent of at least one unsaturated aliphatic compound, compound A, having the structural formula:

wherein $R_1$ is selected from the group consisting of hydrogen and alkyl having 1–4 carbon atoms, and at least .01 mole percent of at least one unsaturated compound, compound B, having the structural formula:

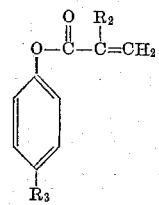

wherein $R_2$ is selected from the group consisting of hydrogen and alkyl having 1–3 carbon atoms and $R_3$ is a tertiary alkyl radical having 4–7 carbon atoms.

10. A process comprising heating a copolymer of 90–99.99 mole percent of at least one unsaturated aliphatic compound, compound A, having the structural formula:

wherein $R_1$ is selected from the group consisting of hydrogen and alkyl having 1–4 carbon atoms, and 0.01–10 mole percent of at least one unsaturated compound, compound B, having the structural formula:

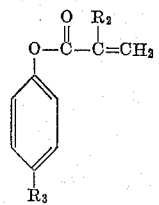

wherein $R_2$ is selected from the group consisting of hydrogen and alkyl having 1–3 carbon atoms and $R_3$ is a tertiary alkyl radical having 4–7 carbon atoms, in the presence of a Friedel-Crafts catalyst to a temperature of 90° C.–125° C. for 5–60 minutes to form a polymer of 90–99.99 mole percent of the recurring unit:

wherein $R_1$ is selected from the group consisting of hydrogen and alkyl having 1–4 carbon atoms, and 0.01–10 mole percent of the recurring unit:

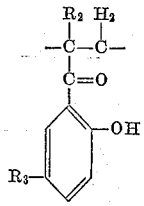

wherein $R_2$ is selected from the group consisting of hydrogen and alkyl having 1–3 carbon atoms and $R_3$ is a tertiary alkyl radical having 4–7 carbon atoms, said polymer having an inherent viscosity of 0.3–3.0 as measured on a solution of 0.1 gram of the polymer in 100 milliliters of alpha-chloronaphthalene at 125° C.

11. A process as in claim 10 wherein compound A is ethylene.

12. A process as in claim 10 wherein compound A is butene-1.

13. A process as in claim 10 wherein compound A is propylene.

14. A process as in claim 10 wherein compound B is p-tertiary-butylphenyl methacrylate.

15. A process as in claim 10 wherein compound B is p-tertiary-butylphenyl acrylate.

16. A polymer comprising 90–99.99 mole percent of the recurring unit:

wherein $R_1$ is selected from the group consisting of hydrogen and alkyl having 1–4 carbon atoms, and 0.01–10 mole percent of the recurring unit:

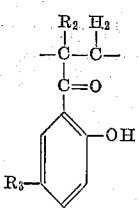

wherein $R_2$ is selected from the group consisting of hydrogen and alkyl having 1–3 carbon atoms and $R_3$ is a tertiary alkyl radical having 4–7 carbon atoms, said polymer having an inherent viscosity of 0.3–3.0 as measured on a solution of 0.1 gram of the polymer in 100 ml. of alpha-chloronaphthalene at 125° C.

17. A polymer as in claim 16 wherein $R_1$ is hydrogen.

18. A polymer as in claim 16 wherein $R_1$ is an ethyl radical.

19. A polymer as in claim 16 wherein $R_1$ is a methyl radical.

20. A polymer as in claim 16 wherein $R_2$ is hydrogen.

21. A polymer as in claim 16 wherein $R_2$ is a methyl radical.

22. A polymer as in claim 16 wherein $R_3$ is a tertiary-butyl radical.

23. A film comprising a polymer of 90–99.99 mole percent of the recurring unit:

wherein

R₁ is selected from the group consisting of hydrogen and alkyl having 1–4 carbon atoms, and 0.01–10 mole percent of the recurring unit:

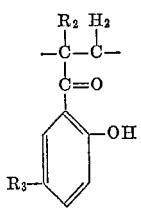

wherein

R₂ is selected from the group consisting of hydrogen and alkyl having 1–3 carbon atoms and R₃ is a tertiary alkyl radical having 4–7 carbon atoms, said polymer having an inherent vsicosity of 0.3–3.0 as measured on a solution of 0.1 gram of the polymer in 100 ml. of alpha-chloronaphthalene at 125° C.

24. A self-supporting film comprising a polymer of 90–99.99 mole percent of the recurring unit:

wherein

R₁ is selected from the group consisting of hydrogen and alkyl having 1–4 carbon atoms, and 0.01–10 mole percent of the recurring unit:

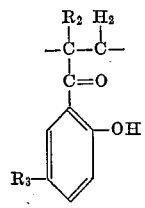

wherein

R₂ is selected from the group consisting of hydrogen and alkyl having 1–3 carbon atoms and R₃ is a tertiary alkyl radical having 4–7 carbon atoms, said polymer having an inherent viscosity of 0.3–3.0 as measured on a solution of 0.1 gram of the polymer in 100 ml. of alpha-chloronaphthalene at 125° C.

25. A filament comprising a polymer of 90–99.99 mole percent of the recurring unit:

wherein

R₁ is selected from the group consisting of hydrogen and alkyl having 1–4 carbon atoms, and 0.01–10 mole percent of the recurring unit:

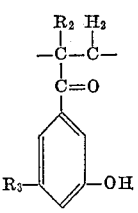

wherein

R₂ is selected from the group consisting of hydrogen and alkyl having 1–3 carbon atoms and R₃ is a tertiary alkyl radical having 4–7 carbon atoms, said polymer having an inherent viscosity of 0.3–3.0 as measured on a solution of 0.1 gram of the polymer in 100 ml. of alpha-chloronaphthalene at 125° C.

References Cited in the file of this patent

UNITED STATES PATENTS 2,961,426    Engelhardt et al. _____ Nov. 22, 1960

OTHER REFERENCES

Schildknecht: Vinyl and Related Polymers, John Wiley & Sons, New York (1959), page 529.

Tsvetkov et al.: Soviet Physics-Technical Physics, vol. 3 (1958), pages 87–96.